J. B. STEVENS.
GLOVE-TREES

No. 179,971. Patented July 18, 1876.

WITNESSES:
C. Neveux
John Goethals

INVENTOR:
J. B. Stevens
BY
Munn/C
ATTORNEYS.

N. PETERS, PHOTO-LITHOGRAPHER, WASHINGTON, D. C.

UNITED STATES PATENT OFFICE.

JOHN B. STEVENS, OF LITTLETON, NEW HAMPSHIRE, ASSIGNOR TO NELSON PARKER, OF SAME PLACE.

IMPROVEMENT IN GLOVE-TREES.

Specification forming part of Letters Patent No. 179,971, dated July 18, 1876; application filed April 18, 1876.

*To all whom it may concern:*

Be it known that I, JOHN B. STEVENS, of Littleton, county of Grafton and State of New Hampshire, have invented an Improved Glove-Tree, of which the following is a specification:

My invention relates to a glove-tree which is made double or in duplicate, and the wrist portions of the two different-sized parts are joined together, so that the fingers project in opposite directions. The tree is made in sections, and a spring is placed between them to make the tree expansible and compressible, as and for the purpose hereinafter explained. The invention also includes a sliding clamp for holding gloves while being drawn on the tree.

Figure 1:
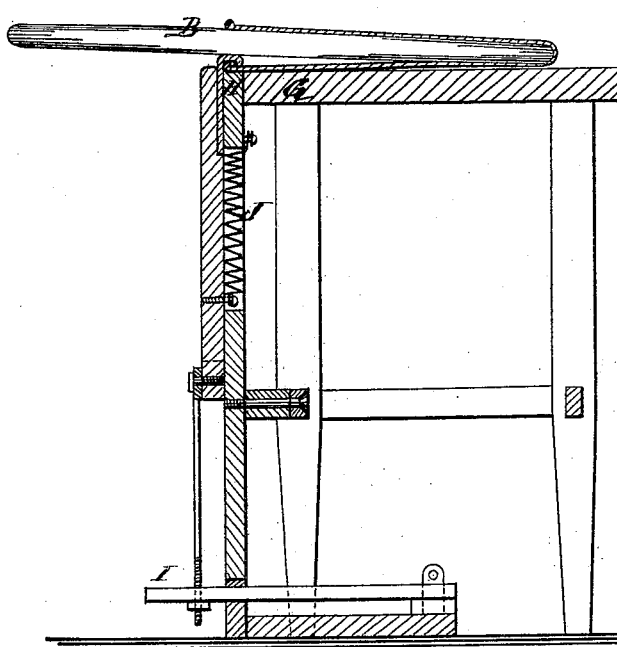
Figure 2:
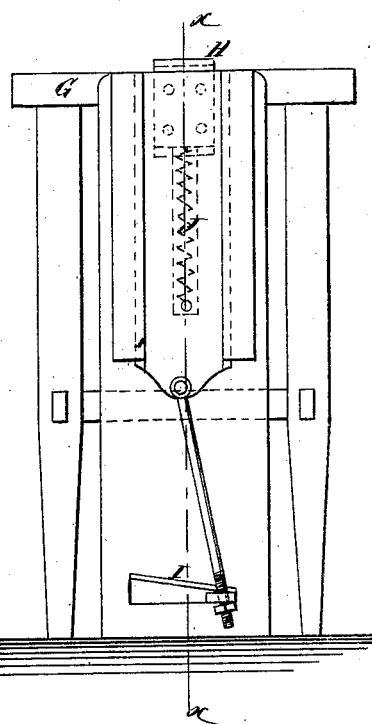
Figure 3:

Figure 1 is a sectional elevation of the improved foot-power holding contrivance for securing the glove while treeing it, also a section of the glove and a side view of the tree, the section being taken on the line $x\,x$ of Fig. 2. Fig. 2 is a front elevation of the holding contrivance, and Fig. 3 is a plan view of the tree.

Similar letters of reference indicate corresponding parts.

The two outside pieces A B of the tree are shaped at C to correspond with the shape of wrist, so that the glove can be buttoned around it for stretching, in connection with space at D between piece A and E to allow the tree to contract for inserting or withdrawing it, while the glove is buttoned, together with a spring, F, for pressing the tree out to stretch the glove. I make the several pieces of the tree with duplicate ends, but in different sizes, so that one tree will serve for two sizes of gloves.

For holding the glove on a table or bench, G, for inserting the tree, I have a vertically-sliding hook-plate, H, to hook into the mouth of the glove and clamp it on the bench, together with a foot-treadle, I, for pressing it down, and a spring, J, for raising it.

Having thus fully described my invention, I claim as new and desire to secure by Letters Patent—

1. In combination with the sections of the tree, the spring F, arranged in a recess and forming the means of connecting one section to the other, as shown.

2. The horizontal table G and the vertically-sliding hook-clamp, adapted to catch upon the edge thereof, and working in vertical guides, and the spring-treadle, all combined and arranged as shown and described, to operate as specified.

3. The tree constructed, as described, in duplicate form at each end, and in different sizes for treeing gloves of different sizes, substantially as specified.

JOHN B. STEVENS.

Witnesses:
   IRA G. STEVENS,
   CLINT. MORSE.